United States Patent Office 2,801,225
Patented July 30, 1957

2,801,225
ODOR INHIBITED POLYETHYLENE

James Harding, Greenbrook Township, Somerset County, N. J., assignor to Union Carbide and Carbon Corporation, a corporation of New York No Drawing. Application October 21, 1954,
Serial No. 463,827

11 Claims. (Cl. 260—41)

This invention relates to inhibiting odor development in polyethylene or polyethylene compositions. More particularly, the invention relates to the stabilization of polyethylene against objectionable odor development by incorporating in the polyethylene a minor amount of certain monohydric phenols as odor inhibitors.

Normally solid polymers of ethylene such as are obtained by the process described in U. S. Patents 2,153,553 or 2,188,465 are well known and widely used in the production of thermoplastic products such as film, sheeting, and molded articles. Virgin polyethylene as obtained from the polymerizing equipment is generally practically odorless, but upon extended storage, and especially at elevated temperatures, e. g. 35° C.–90° C. or when subjected to heat required for processing as in extrusion or molding, the polyethylene develops a rancidlike odor. The odor intensity, which is somewhat similar in its sharpness to butyric acid, varies according to the exposure conditions, thus it is more intense in closed atmospheres as for example the interior of sealed polyethylene bottles or jars than is the case with polyethylene sheeting used as external wrapping or packaging material. However, odor can be readily detected on polyethylene sheeting stored for some time in a closed package. Apparently, while polyethylene is regarded as one of the more stable polymers, it nevertheless under conditions of normal usage or heat-processing suffers some slight decomposition sufficient to be detected olfactorily. Such odor development has caused consumers to be aesthetically dissatisfied with polyethylene articles such as cosmetic jars, bottles, and film or sheeting particularly when in contact with foodstuffs.

It has now been found that objectionable odor development in polyethylene can be substantially suppressed by incorporating in the polyethylene relatively small amounts of a trialkyl substituted monohydric phenol in which the two ortho positions and the para position contain an alkyl substituent, for example methyl, ethyl, butyl, amyl, octyl, nonyl and dodecyl and free from any substituents other than hydrogen on the two meta positions.

Such phenols are represented by the formula:

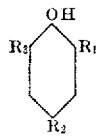

wherein $R_1$, $R_2$ and $R_3$ are each the same or a different alkyl radical. Somewhat higher efficiencies in suppressing odor has been observed when $R_1$ and $R_3$ are tertiary alkyl groups instead of normal or secondary alkyl groups and hence such phenols are preferred.

Specific phenols within the scope of the above formula and useful in the practice of this invention are the following:

2,4,6-trimethyl phenol
2,4,6-triisopropyl phenol
2,4,6-triethyl phenol
2,4,6-tritertiary butyl phenol
2,4,6-tritertiary amyl phenol
2-tertiary butyl-4,6-dimethyl phenol
2,6-diethyl-4-methyl phenol
2,6-ditertiary butyl-4-methyl phenol
2,6-dipropyl-4-methyl phenol
2,6-diethyl-4-tertiary butyl phenol
2,6-ditertiary butyl-4-tertiary amyl phenol
2,6-dimethyl-4-dodecyl phenol
2,6-ditertiary butyl-4-nonyl phenol The discovery that trialkyl substituted phenols of the aforedescribed type are effective in suppressing odor development in polyethylene is considered most surprising in view of the fact that while these phenols when freshly prepared are generally characterized by a mild unobjectionable odor, they have been reported as tending to develop an objectionable odor upon storage. Thus, in Menn, et al. U. S. Patent 2,672,485 it is suggested that alkyl phenols be stabilized against deterioration in odor by treating the phenol with from about 0.01% to 5% by weight or organic polybasic carboxylic acids or salts thereof.

For the purposes of the present invention it is not essential to stabilize the alkyl substituted phenol as suggested by Menn, et al., however, if desired, such stabilized phenols can be employed for incorporation in polyethylene.

Incorporation in polyethylene of amounts as little as 0.0005% by weight of a 2,4,6-trialkyl substituted phenol has been found effective in suppressing or minimizing odor development in polyethylene. Preferably there are employed amounts of trialkyl substituted phenol between 0.001% to 0.02% by weight of the polyethylene, since within this range satisfactory inhibition of the odor normally developed in uninhibited polyethylene is prevented over extended periods of time without at the same time imparting to the polyethylene a phenolic odor perceptible to the average person. The threshold concentration of trialkyl substituted phenol in polyethylene at which a phenolic odor in polyethylene may be observed is about 0.2% to 0.5% depending of course on the particular phenol used. Where a phenolic odor is unobjectionable or preferable over the rancid type odor developed in unstabilized polyethylene, amounts up to about 2% to 4% may be used without marked impairment of the normal physical properties of polyethylene such as tensile strength and solvent resistance.

Incorporation and satisfactory dispersion of the phenol into the polyethylene can be by way of fluxing the polyethylene with the phenol on heating on heated open rolls, at which time fillers and/or coloring agents such as pigments or dyes may be added if desired. Other suitable mixing procedures include the use of Banbury mixers and of heated extruders of the single or double screw type.

The use of a trialkyl substituted phenol to suppress odor is effective not only with clear polyethylene compositions, but also with compositions pigmented with organic or inorganic compounds of chromium or manganese which when uninhibited often develop an odor more quickly than a clear polyethylene composition. Chromium and manganese compounds as for example hydrated chromic oxide, manganese dioxide, manganese ammonium pyrophosphate (Nurnberg Violet) employed as pigments in polyethylene compositions have been observed to accelerate odor development whereas other pigments, as for example titanium dioxide are comparatively inert either in inhibiting or promoting odor development in polyethylene.

The process and resultant products of the invention are further exemplified in the following examples.

Example 1

A six pound batch of polyethylene (average molecular weight 21,000) was compounded with 0.5% by weight of 2,6-ditertiary butyl-4-methyl phenol in a Banbury mixer for 15 minutes at 135° C.–140° C. to form a relatively concentrated master batch dispersion of the phenol suitable for mixing with additional uninhibited polyethylene. The hot master batch was transferred from the Banbury to mixing rolls having a roll surface temperature of 50° C. to sheet the batch. The resultant sheets were cooled and then granulated. One pound of this granulated composition was dry blended with 24 pounds of granulated uninhibited polyethylene (average molecular weight 21,000) by tumbling for 30 minutes, producing a mixture containing 0.02% by weight of the trialkyl phenol. The tumbled mix was fluxed at 150° C. in an extruder, and the extruded product was pelletized. One sample of these pellets was placed in a clean glass jar which was then sealed to retain therein any odors which might be given off by the sample during storage at room temperature. Another sample of the same pellets was extruded once more to determine the effect on odor from this additional exposure to heat and this twice extruded product was also placed in a clean glass jar. After storage for two weeks at room temperature, the jars containing the two phenol inhibited samples together with a jar containing virgin polyethylene which had been subjected to the thermal abuse of only one extrusion operation were opened and compared as to odor content. Both phenol inhibited polyethylene samples were so essentially free of odor as determined by a staff of five experienced testers that the product could be used as molded containers or wrapping for such odor sensitive materials as foods, condiments and cosmetics. The jar containing virgin polyethylene sample when opened had a sharp rancid odor and was judged unsatisfactory for the aforementioned uses.

Example 2

An odor stabilized polyethylene composition pigmented with an organic manganese compound and suitable for injection molding was prepared by fluxing in a Banbury mixer at 110° C. the following components:

| | Parts by weight |
|---|---|
| Polyethylene | 100.0 |
| "Pigment Rubine 3G" | 1.0 |
| 2,4,6-tritertiary butyl phenol | 0.2 |

"Pigment Rubine 3G" is the trade name for a maroon pigment which is essentially the manganese salt of 4-chloroaniline-3-sulfonic acid diazo coupled to beta-hydroxynaphthoic acid.

This composition was sheeted on warm mixing rolls, the sheet granulated, and then stored in glass jars as described in Example 2 at a temperature of 60° C. At the end of three weeks, no objectionable odor was detected upon opening the glass jar. On the other hand, the same pigmented composition, but free from phenol inhibitor, when similarly stored and processed had developed a strong, pungent, rancid-like odor in one week's storage.

Example 3

A polyethylene composition pigmented with a chromium compound was prepared by mixing and granulating as described in Example 2 the following formulation, all parts being by weight:

| | Parts |
|---|---|
| Polyethylene (average molecular weight 19,000) | 100.0 |
| Hydrated chromic oxide | 1.0 |
| 2,6-ditertiary butyl-4-methyl phenol | 0.2 |

The granules were stored in clean capped glass jars at 40° C. and examined periodically for possible odor development. After 12 months' storage at 40° C., no rancid-like odor was evident and only a faint phenolic-like odor was perceptible.

Odor tests made on a granulated composition identical to Example 3, except that no phenol inhibitor was incorporated, showed a very strong, rancid and acidic odor developed after two months' storage at 40° C. in sealed glass jars containing the granulated polyethylene.

What is claimed is:

1. A polyethylene composition containing a 2,4,6-trialkyl substituted monohydric phenol in amount suppressing rancid odor development in the polyethylene.

2. A composition comprising a normally solid polymer of ethylene and between 0.0005% and 4% by weight thereof of a 2,4,6-trialkyl substituted monohydric phenol.

3. A composition comprising a normally solid polymer of ethylene and between 0.001% and 0.02% by weight thereof of a 2,4,6-trialkyl substituted monohydric phenol.

4. Composition inhibited against odor development on aging comprising a normally solid polymer of ethylene and about 0.001% to 0.02% by weight thereof of 2,6-ditertiary butyl-4-methyl phenol.

5. An odor stabilized pigmented polyethylene composition comprising a normally solid polymer of ethylene, a chromium pigment and between 0.0005% and 4% by weight of the ethylene polymer of a 2,4,6-trialkyl substituted monohydric phenol.

6. An odor stabilized pigmented polyethylene composition comprising a normally solid polymer of ethylene, a manganese pigment and between 0.0005% and 4% by weight of the ethylene polymer of a 2,4,6-trialkyl substituted monohydric phenol.

7. An odor stabilized pigmented polyethylene composition, comprising a normally solid polymer of ethylene, a metal atom containing pigment, said metal being selected from the group consisting of chromium and manganese, and between 0.0005% and 4% by weight of the ethylene polymer of a 2,4,6-trialkyl substituted monohydric phenol.

8. Composition inhibited against odor development on aging comprising a normally solid polymer of ethylene and about 0.001% to about 0.02% by weight thereof of 2,4,6-tritertiary amylphenol.

9. Composition inhibited against odor development on aging comprising a normally solid polymer of ethylene and about 0.001% to about 0.02% by weight thereof of 2,4,6-tritertiary butylphenol.

10. Composition inhibited against odor development on aging comprising a normally solid polymer of ethylene and about 0.001% to about 0.02% by weight thereof of 2-tertiary butyl-4,6-dimethylphenol.

11. Composition inhibited against odor development on aging comprising a normally solid polymer of ethylene and about 0.001% to about 0.02% by weight thereof of 2,6-ditertiary butyl-4-tertiary amylphenol.

References Cited in the file of this patent

UNITED STATES PATENTS

| 2,470,447 | Van Gilder | May 17, 1949 |

FOREIGN PATENTS

| 470,325 | Canada | Dec. 26, 1950 |

Disclaimer 2,801,225.—*James Harding*, Greenbrook Township, Somerset County, N.J. ODOR INHIBITED POLYETHYLENE. Patent dated July 30, 1957. Disclaimer filed Dec. 3, 1963, by the assignee, *Union Carbide Corporation*.

Hereby enters this disclaimer to claims 1, 2, 3, 4, 8, 9, 10, and 11 of said patent.

[*Official Gazette February 18, 1964.*]